(12) United States Patent
Wakabayashi et al.

(10) Patent No.: US 11,012,615 B2
(45) Date of Patent: May 18, 2021

(54) IMAGING APPARATUS, CONTROL METHOD AND NON-TRANSITORY COMPUTER READABLE MEDIUM THAT DETERMINES A CONFUSED STATE

(71) Applicant: FUJIFILM Corporation, Tokyo (JP)

(72) Inventors: Satoru Wakabayashi, Saitama (JP); Yuji Hasegawa, Saitama (JP); Shunta Ego, Saitama (JP); Tomoyuki Mizuta, Saitama (JP); Yukinori Nishiyama, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/539,679

(22) Filed: Aug. 13, 2019

(65) Prior Publication Data

US 2019/0364198 A1    Nov. 28, 2019

Related U.S. Application Data

(63) Continuation of application No. PCT/JP2018/004075, filed on Feb. 6, 2018.

(30) Foreign Application Priority Data

Feb. 14, 2017   (JP) .............................. JP2017-024786

(51) Int. Cl.
*H04N 5/232* (2006.01)
(52) U.S. Cl.
CPC ..... *H04N 5/23222* (2013.01); *H04N 5/23216* (2013.01); *H04N 5/232941* (2018.08)
(58) Field of Classification Search
CPC ........... H04N 5/2322; H04N 5/232941; H04N 5/23216; G06F 3/0482; G03B 17/18
See application file for complete search history.

(56) References Cited

U.S. PATENT DOCUMENTS

2003/0234246 A1\* 12/2003 Arnold .................... F24C 7/082
219/445.1
2006/0152599 A1\* 7/2006 Yokonuma ........... H04N 1/2158
348/231.99

(Continued)

FOREIGN PATENT DOCUMENTS

CN       101287081 A     10/2008
JP       2013-31205 A     2/2013

(Continued)

OTHER PUBLICATIONS

International Preliminary Report on Patentability and English translation of the Written Opinion of the International Searching Authority for International Application No. PCT/JP2018/004075, dated Aug. 29, 2019.

(Continued)

*Primary Examiner* — Antoinette T Spinks
(74) *Attorney, Agent, or Firm* — Birch, Stewart, Kolasch & Birch, LLP

(57) ABSTRACT

A digital camera includes a detection unit, an operation history storage unit, an analysis unit, a determination unit, and a warning unit. The detection unit detects an imaging operation and a setting operation of a user as user operation information. The setting operation is an operation to set setting information of a first setting item and setting information of a second setting item selectable exclusively with respect to the setting information of the first setting item for setting items relating to imaging conditions. The analysis unit acquires normal operation information based on an imaging operation history and a setting operation history stored in the operation history storage unit. After the normal operation information is acquired, in a case where the user operation information is different from the normal operation information, the determination unit determines that the user (Continued)

is in the confused state. The warning unit issues a warning in a case where determination is made to be the confused state.

7 Claims, 11 Drawing Sheets

(56) References Cited

U.S. PATENT DOCUMENTS

| | | | |
|---|---|---|---|
| 2008/0246889 A1 | 10/2008 | Moon | |
| 2015/0026632 A1* | 1/2015 | Wakabayashi | H04N 5/23209 715/776 |
| 2018/0220015 A1* | 8/2018 | Akuzawa | H04N 1/00517 |
| 2019/0306349 A1* | 10/2019 | Shino | H04N 1/00517 |

FOREIGN PATENT DOCUMENTS

| | | |
|---|---|---|
| JP | 2013-219440 A | 10/2013 |
| JP | 2015-153325 A | 8/2015 |
| JP | 2015153325 A * | 8/2015 |
| WO | WO 2013/153711 A1 | 10/2013 |

OTHER PUBLICATIONS

International Search Report for International Application No. PCT/JP2018/004075, dated Apr. 17, 2018, with English translation.
Chinese Office Action and Search Report, dated Sep. 3, 2020, for Chinese Application No. 201880011797.1, with an English translation of the Chinese Office Action.

* cited by examiner

FIG. 4

| SETTING MENU | |
|---|---|
| IMAGE QUALITY MODE | FINE |
| SHUTTER SYSTEM | MS |
| FLASH MODE | AUTO |
| IMAGING MODE | BRACKET |
| ISO SENSITIVITY | 1600 |
| DYNAMIC RANGE SETTING | 400 |

NEXT PAGE

FIG. 5

| SHUTTER SYSTEM | MS |
|---|---|
| | ES |
| | MS + ES |

RETURN          OK

IMAGING APPARATUS, CONTROL METHOD AND NON-TRANSITORY COMPUTER READABLE MEDIUM THAT DETERMINES A CONFUSED STATE

CROSS-REFERENCE TO RELATED APPLICATIONS

This application is a Continuation of PCT International Application No. PCT/JP2018/004075 filed on 6 Feb. 2018, which claims priority under 35 U.S.C § 119(a) to Japanese Patent Application No. 2017-024786 filed on 14 Feb. 2017. The above application is hereby expressly incorporated by reference, in its entirety, into the present application.

BACKGROUND OF THE INVENTION

1. Field of the Invention

The present invention relates to an imaging apparatus, a control method and a non-transitory computer readable medium.

2. Description of the Related Art

Among imaging apparatuses, such as a digital camera, an imaging apparatus that can set various imaging conditions to capture high-quality images is known. In such an imaging apparatus, in general, there is setting information that cannot be set simultaneously and is in a so-called exclusive relationship in a plurality of imaging conditions.

An imaging apparatus described in JP2013-219440A has a dynamic range magnified imaging function and an exposure adjustment function. In the imaging apparatus, imaging conditions relating to the exposure adjustment function can be set from setting information of a plurality of shutter speeds, a plurality of F numbers, AUTO (automatic setting), and the like, and setting information of on/off can be set as imaging conditions relating to the dynamic range magnified imaging function. However, these kinds of setting information have an exclusive relationship, and in a case where any one of a shutter speed and an F number is selected, the dynamic range magnified imaging function cannot be turned on. Alternatively, in a case where the dynamic range magnified imaging function is turned on, the exposure adjustment function cannot be set other than AUTO.

As the setting information having the exclusive relationship, in addition to the above-described setting information, setting information of a shutter system and setting information of a continuous shooting speed are exemplified. For example, the shutter system can be set from setting information of an electronic shutter, a mechanical shutter, and the like, and the continuous shooting speed can be set from a plurality of set values. Then, in a case where the mechanical shutter of a lower speed than the electronic shutter is selected, a set value of high speed cannot be selected as the continuous shooting speed.

In recent years, a technique that detects a state in which a user is confused about an operation is known. In an information processing apparatus described in JP2015-153325A, a detection signal obtained by detecting motion or a state of the user is analyzed, and a user operation state when the user performs an operation is detected. Then, the detected user operation state is collated with confused state information stored in advance, and determination is made whether or not the user is confused about an operation. In a case where determination is made that the user is in the confused state, operation guide is provided to the user.

SUMMARY OF THE INVENTION

As described above, in a case where there is setting information in an exclusive relationship, the setting information is restricted to setting information unintended by the user. For example, in a case where the electronic shutter of the imaging apparatus is a sequential reading type rolling shutter, and high-speed continuous imaging is performed, a rolling shutter phenomenon that a subject image is distorted may occur. Accordingly, in a case where the user changes the shutter system from the electronic shutter to the mechanical shutter, as described above, the continuous shooting speed is restricted to a set value of low speed.

While the user will perform high-speed continuous imaging, since the continuous shooting speed is restricted to a low speed, the user is confused about an operation. Even though the user tries to restore the continuous shooting speed to a high speed, the user cannot specify a cause, and may lose a chance to capture an image.

In the imaging apparatus described in JP2013-219440A described above, a warning is performed in a case where the setting information in the exclusive relationship is set regardless of an operation state of the user. It is considered that the technique described in JP2015-153325A described above is applied to the imaging apparatus described in JP2013-219440A described above, and in a case where the confused state of the user is detected, operation guide including a warning that the setting information in the exclusive relationship is set is provided. However, even in this case, the user who is unaccustomed to setting cannot easily specify the setting information in the exclusive relationship from the provided operation guide, and may lose a chance to capture an image.

An object of the invention is to provide an imaging apparatus that determines a state in which a user is confused about an operation and easily resolves a confused state, and a control method and a non-transitory computer readable medium.

In order to achieve the above-described object, the invention provides an imaging apparatus comprising an imager, an imaging operation member, a setting operation member, and a processor. The imager captures a subject image. The imaging operation member makes the imager perform an imaging operation. The setting operation member sets setting information of a first setting item and setting information of a second setting item selectable exclusively with respect to the setting information of the first setting item for setting items relating to imaging conditions of the imager. The processor detects an imaging operation of a user on the imaging operation member and a setting operation of the user on the setting operation member as user operation information. The processor stores an imaging operation history as a history relating to the imaging operation and a setting operation history as a history relating to the setting operation performed before the imaging operation. The processor analyzes an operation of the user during a normal time on the imaging operation member and the setting operation member based on the imaging operation history and the setting operation history to acquire normal operation information. The processor determines that the user is in a confused state in which the user is confused about an operation in a case where the user operation information is different from the normal operation information after the normal operation information is acquired. The processor issues a warning in a case where it is determined to be the confused state.

It is preferable that the setting operation history is the number of times of setting of each piece of the setting information set by the setting operation member for at least one of the first setting item or the second setting item, the processor acquires high-frequency setting information to be set by the user with a high frequency as the normal operation information based on the number of times of setting of each piece of setting information, and determines to be the confused state in a case where setting information based on the user operation information is different from the high-frequency setting information.

It is preferable that the setting operation history is the number of times of setting of each setting operation pattern of the setting operation member including a setting operation for at least one of the first setting item or the second setting item, the processor acquires a high-frequency setting operation pattern, in which the user performs the setting operation with a high frequency, as the normal operation information based on the number of times of setting of each setting operation pattern, and determines to be the confused state in a case where a setting operation pattern based on the user operation information is different from the high-frequency setting operation pattern.

It is preferable that an imaging time at which the imaging operation is performed is included in the imaging operation history, the processor acquires a reference imaging interval, at which the user performs an imaging operation, as the normal operation information based on the imaging time, and compares the reference imaging interval with an imaging interval based on the user operation information to determine whether or not to be the confused state.

It is preferable that, in a case where the processor determines to be the confused state, the user operation information to be a base of determination is prohibited from being stored as the setting operation history or the imaging operation history, and in a case where the processor determines to be not the confused state, the user operation information to be a base of determination is stored as the setting operation history or the imaging operation history.

It is preferable that the imaging apparatus further comprises a display that displays a setting screen for performing the setting operation, and the processor performs warning display on the display.

The invention also provides a control method for an imaging apparatus. The imaging apparatus comprises an imager that captures a subject image, an imaging operation member that makes the imager perform an imaging operation, a setting operation member that sets setting information of a first setting item and setting information of a second setting item selectable exclusively with respect to the setting information of the first setting item for setting items relating to imaging conditions of the imager, and a processor that detects an imaging operation of a user on the imaging operation member and a setting operation of the user on the setting operation member as user operation information, and stores an imaging operation history as a history relating to the imaging operation and a setting operation history as a history relating to the setting operation performed before the imaging operation. The control method comprises a step of analyzing an operation of the user during a normal time on the imaging operation member and the setting operation member based on the imaging operation history and the setting operation history to acquire normal operation information, a step of determining that the user is in a confused state in which the user is confused about an operation in a case where the user operation information is different from the normal operation information after the normal operation information is acquired, and a step of issuing a warning in a case where determination is made to be the confused state.

The invention also provides a non-transitory computer readable medium for storing a computer-executable program for operating an imaging apparatus. The imaging apparatus comprises an imager that captures a subject image, an imaging operation member that makes the imager perform an imaging operation, and a setting operation member that sets setting information of a first setting item and setting information of a second setting item selectable exclusively with respect to the setting information of the first setting item for setting items relating to imaging conditions of the imager. The computer-executable program causes the computer to execute a function of detecting an imaging operation of a user on the imaging operation member and a setting operation of the user on the setting operation member as user operation information, a function of storing an imaging operation history as a history relating to the imaging operation and a setting operation history as a history relating to the setting operation performed before the imaging operation, a function of analyzing an operation of the user during a normal time on the imaging operation member and the setting operation member based on the imaging operation history and the setting operation history to acquire normal operation information, a function of determining that the user is in a confused state in which the user is confused about an operation in a case where the user operation information is different from the normal operation information after the normal operation information is acquired, and a function of issuing a warning in a case where determination is made to be the confused state.

According to the invention, it is possible to determine a state in which a user is confused about an operation, and to easily resolve a confused state.

BRIEF DESCRIPTION OF THE DRAWINGS

FIG. 4 is an explanatory view of a setting screen showing an example of a setting menu.

FIG. 5 is an explanatory view of the setting screen in a state in which setting information of a shutter system is set in the setting menu.

DESCRIPTION OF THE PREFERRED EMBODIMENTS

First Embodiment

Figure 1:
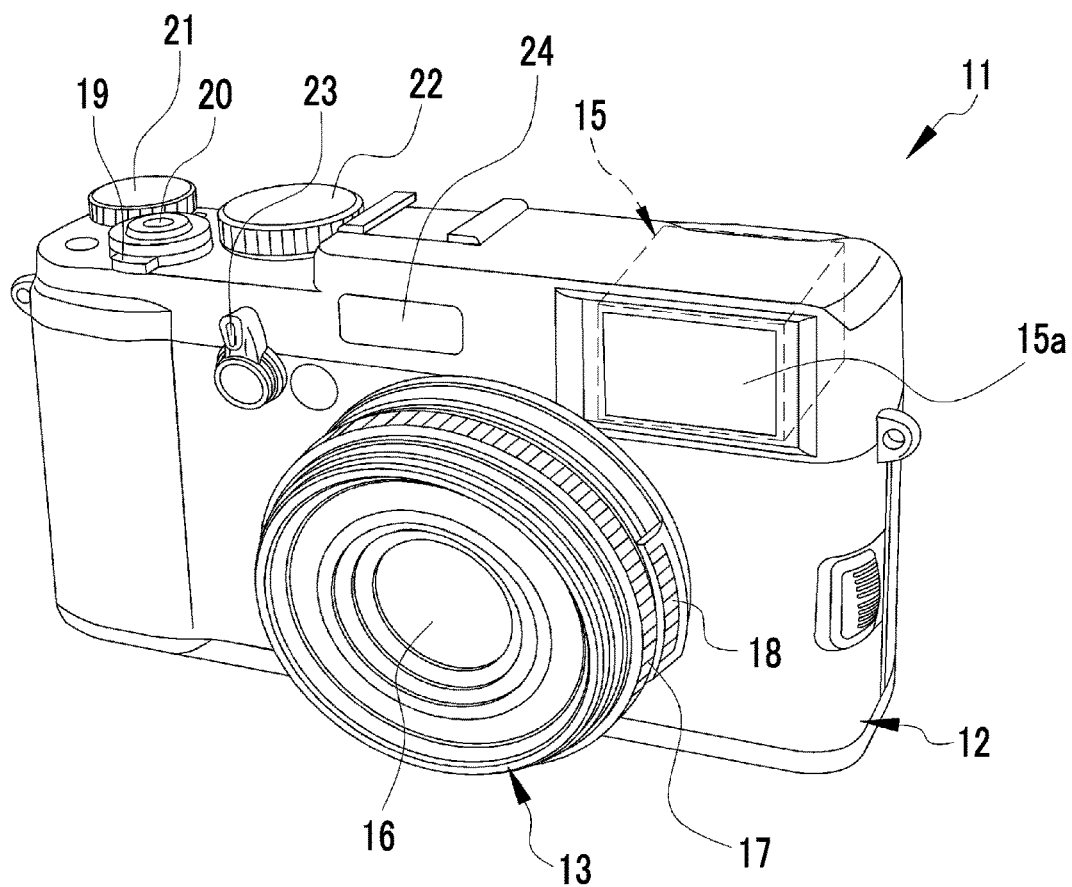
FIG. 1 is a perspective view showing an appearance of a digital camera from a front side.
Figure 2:
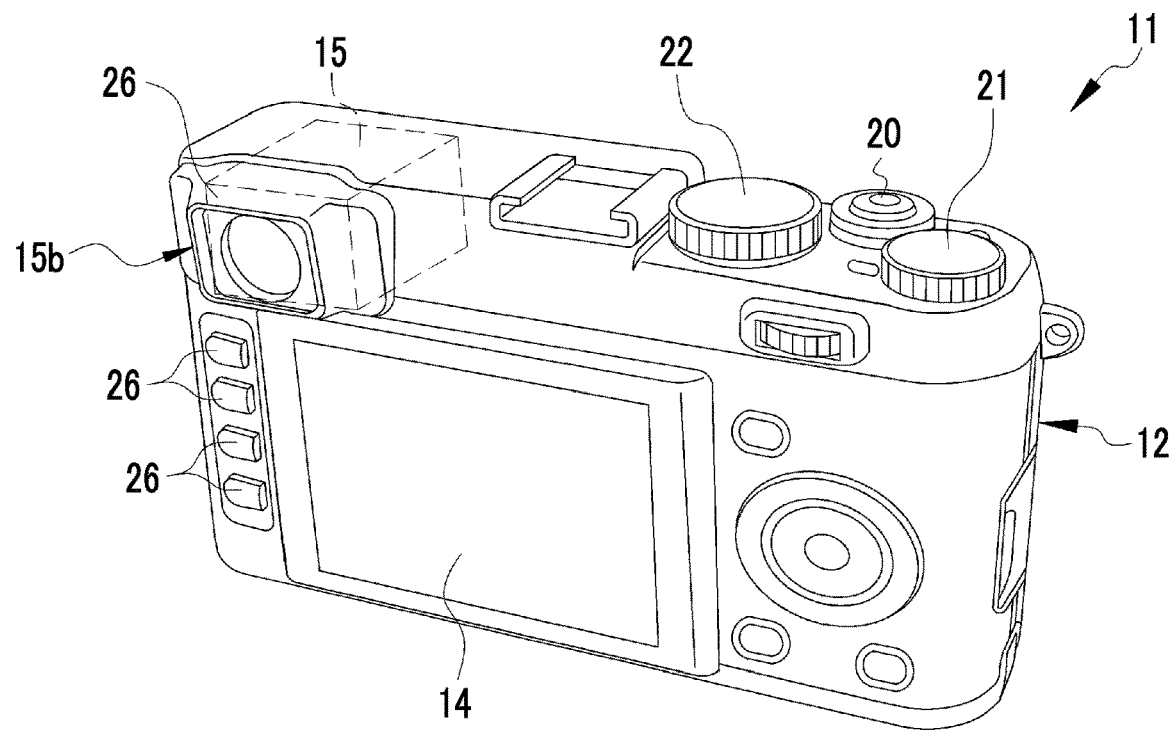
FIG. 2 is a perspective view showing the appearance of the digital camera from a rear side.

In FIGS. 1 and 2, a digital camera 11 as an imaging apparatus comprises a camera body 12, a lens barrel 13, a rear display unit 14, and a finder unit 15.

The lens barrel 13 is provided on a front surface of the camera body 12, and holds an imaging optical system 16. A focus ring 17 and a stop ring 18 are provided rotatably on an outer periphery of the lens barrel 13. The focus ring 17 and the stop ring 18 are manually rotated by a photographer, thereby performing focus adjustment and stop adjustment of the imaging optical system 16.

The rear display unit 14 is provided on a rear surface of the camera body 12 and is used for display of a live view image, reproduction of a captured image, display of a setting menu, and the like. The rear display unit 14 is constituted of, for example, an LCD panel. A touch panel 27 (see FIG. 3) is attached to a surface of the rear display unit 14, and an input instruction from the touch panel 27 is transmitted to a main control unit 41. The touch panel 27 is used for various setting operations and the like.

A power lever 19, a release switch 20, an exposure correction dial 21, a shutter speed dial 22, and the like are provided on an upper surface of the camera body 12. A finder switch lever 23, a flash light emission unit 24, and the like are provided on the front surface of the camera body 12. A plurality of operation buttons 26 are provided on the rear surface of the camera body 12. A plurality of operation buttons 26 are used for various setting operations and the like.

The power lever 19 is operated in turning on/off a power source (not shown) of the digital camera 11. The release switch 20 is operated in executing imaging. The shutter speed dial 22 is operated in switching a shutter speed of the digital camera 11.

The release switch 20 has a two-stage stroke type switch (not shown) constituted of an S1 switch and an S2 switch. In a case where the release switch 20 is depressed (half depression) and the S1 switch is brought into an on state, an imaging preparation operation, such as automatic exposure adjustment, is performed by an imaging unit described below. In a case where the release switch 20 is further depressed (full depression) from this state and the S2 switch is brought into an on state, an imaging operation is performed by the imaging unit. The release switch 20 functions as an imaging operation unit that makes the imaging unit perform an imaging operation. Hereinafter, an operation of the user on the release switch 20 is referred to as an imaging operation.

In a bottom portion of the camera body 12, a slot (not shown) for mounting a recording medium 51 (see FIG. 3) described below and a loading lid (not shown) for opening and closing an aperture of the slot are provided.

The finder unit 15 is a hybrid type capable of switching between an optical view finder (hereinafter, referred to as an "OVF") mode and an electronic view finder (hereinafter, referred to as an "EVF") mode. The finder switch lever 23 is operated in switching the finder unit 15 between the OVF mode and the EVF mode.

The finder unit 15 has a finder objective window 15a that takes an optical image of a subject, and a finder eyepiece unit 15b with which an eye of the photographer comes into contact. The finder objective window 15a is provided on the front side of the camera body 12. The finder eyepiece unit 15b is provided on the rear side of the camera body 12.

The finder unit 15 comprises an in-finder display unit 28 (see FIG. 3), a half mirror (not shown), and the like. The in-finder display unit 28 displays an image of the subject obtained by capturing the optical image of the subject with the imaging element 34. The optical image of the subject is incident on the finder objective window 15a. The half mirror partially transmits the optical image incident on the finder objective window 15a to guide the optical image to the finder eyepiece unit 15b, and partially reflects the display image displayed on the in-finder display unit 28 to guide the display image to the finder eyepiece unit 15b.

The finder unit 15 has a shutter (hereinafter, referred to as an OVF shutter) that shields the optical image incident on the finder objective window 15a. In the OVF mode, the OVF shutter is brought into an open state and the in-finder display unit 28 is brought into a non-display state, whereby the optical image is guided to the finder eyepiece unit 15b. In EVF mode, the OVF shutter is brought into a closed state and the in-finder display unit 28 is brought into a display state, whereby the display image is guided to the finder eyepiece unit 15b.

Figure 3:
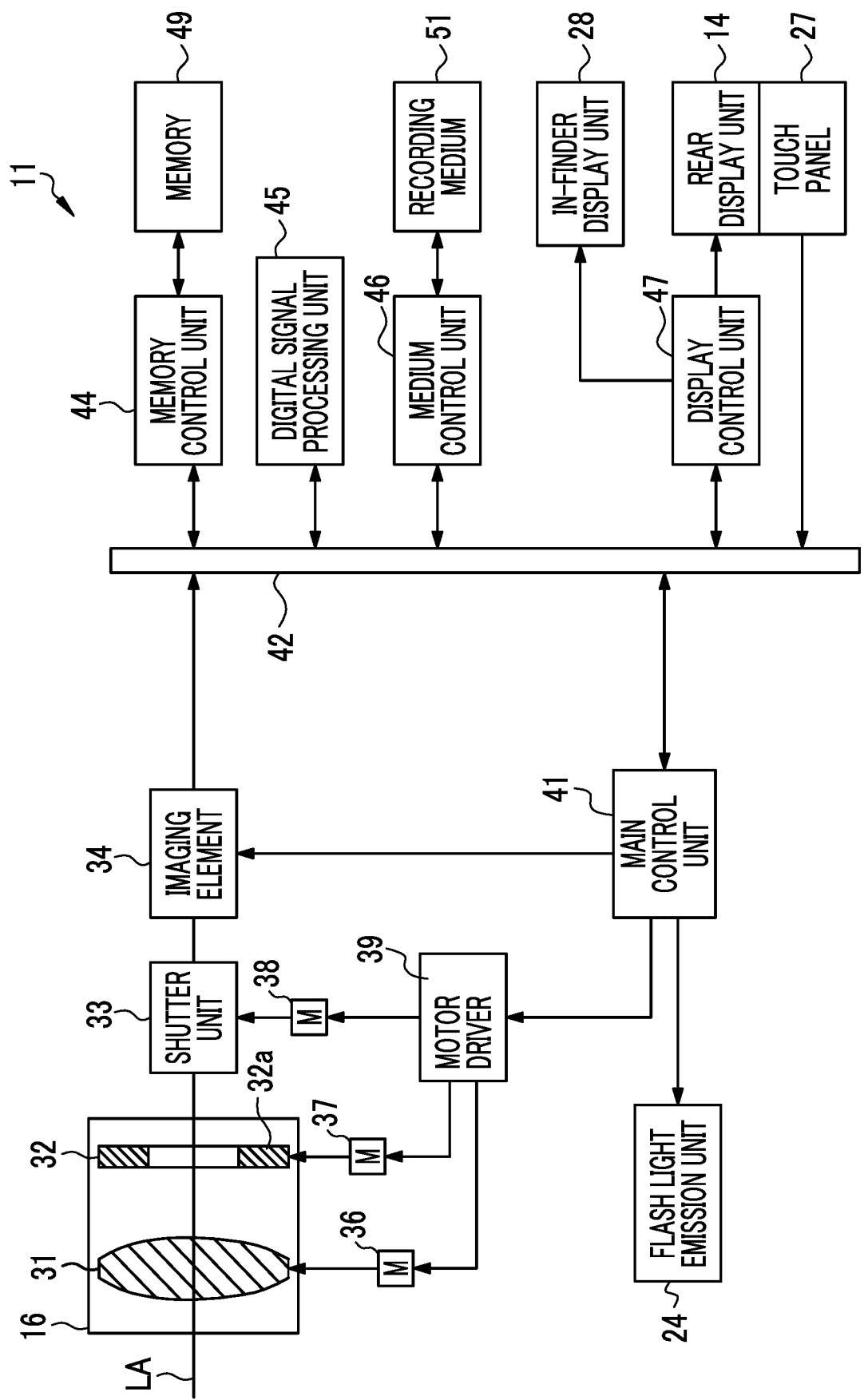
FIG. 3 is a block diagram showing the configuration of the digital camera.

In FIG. 3, the imaging optical system 16 comprises a plurality of lenses including a focus lens 31, a stop unit 32, and the like. A shutter unit 33 and an imaging element 34 are disposed behind the imaging optical system 16 along an optical axis LA of the imaging optical system 16. The imaging element 34 is provided inside the camera body 12.

The focus lens 31 is moved in a direction of the optical axis LA with driving of a motor 36 and adjusts an imaging distance. The main control unit 41 transmits a control signal for moving the focus lens 31 to a motor driver 39 according to a rotation direction and an amount of rotation of the focus ring 17 detected based on a signal of a detection unit (not shown). The motor driver 39 drives the motor 36 based on the control signal.

The stop unit 32 moves a plurality of stop leaf blades 32a with driving of a motor 37 and changes an amount of light incident on the imaging element 34. The optical image of the subject that is transmitted through the imaging optical system 16 and has an amount of light adjusted by a stop 30 is incident on the imaging element 34. The main control unit 41 transmits a control signal for moving the stop leaf blades 32a to the motor driver 39 according to an angle position of the stop ring 18 detected based on a signal of a sensor (not shown). The motor driver 39 drives the motor 37 based on the control signal.

The shutter unit 33 is a mechanical shutter, such as a focal plane shutter, and is disposed between the stop unit 32 and the imaging element 34. The shutter unit 33 is provided to shut off an optical path between the imaging optical system 16 and the imaging element 34, and changes between an aperture open state and an aperture closed state.

The shutter unit 33 is brought into the aperture open state at the time of live view image and video imaging. The shutter unit 33 is temporarily brought into the aperture closed state from the aperture open state at the time of static image capturing. The shutter unit 33 is driven by a motor 38. The main control unit 41 transmits a control signal for operating the shutter unit 33 to the motor driver 39 according to setting information of a shutter system described below. The motor driver 39 drives the motor 38 based on the control signal.

The imaging element 34 is driven and controlled by the main control unit 41. The imaging element 34 constitutes an imaging unit along with the shutter unit 33, the digital signal processing unit 45, and the like. In a case of flash imaging using the flash light emission unit 24, the flash light emission unit 24 also constitutes the imaging unit. The imaging element 34 is, for example, a single-plate color imaging type CMOS image sensor having an RGB color filter. The imaging element 34 has a light receiving surface constituted of a plurality of pixels (not shown) arranged in a two-dimensional matrix. Each pixel includes a photoelectric conversion element, and captures the subject image formed on the light receiving surface by the imaging optical system 16 through photoelectric conversion to generate an imaging signal. The imaging element 34 has an electronic shutter function, and a shutter speed (electric charge accumulation time) thereof can be adjusted. In the embodiment, the shutter system of the electronic shutter is a rolling shutter system. In the rolling shutter system, the imaging element 34 executes signal reading according to a sequential reading system. In the sequential reading system, signal reading is performed one by one pixel row in order from a first pixel row to a last pixel row for all pixels.

The imaging element 34 comprises signal processing circuits (all are not shown), such as a noise elimination circuit, an automatic gain controller, and an A/D conversion circuit. The noise elimination circuit executes noise elimination processing on the imaging signal. The automatic gain controller amplifies the level of the imaging signal to an optimum value. The A/D conversion circuit converts the imaging signal to a digital signal and outputs the digital signal from the imaging element 34. An output signal of the imaging element 34 is image data (so-called RAW data) having one pixel value for each pixel.

The imaging element 34 and the main control unit 41 are connected to a bus 42. In addition, a memory control unit 44, a digital signal processing unit 45, a medium control unit 46, a display control unit 47, the release switch 20, the operation buttons 26, the touch panel 27, and the like are connected to the bus 42.

A memory 49 for temporary storage, such as an SDRAM, is connected to the memory control unit 44. The memory control unit 44 inputs and stores image data output from the imaging element 34 to the memory 49. The memory control unit 44 outputs image data stored in the memory 49 to the digital signal processing unit 45.

The digital signal processing unit 45 executes known image processing, such as matrix calculation, demosaic processing, γ correction, brightness and color difference conversion, and resizing processing, on image data input from the memory 49, and generates a subject image based on the pixel value of each pixel.

The medium control unit 46 controls recording and reading of image files on and from a recording medium 51. The recording medium 51 is, for example, a memory card embedded with a flash memory. The medium control unit 46 records image data compressed by the digital signal processing unit 45 on the recording medium 51.

The display control unit 47 controls image display on the rear display unit 14 and the in-finder display unit 28. Specifically, the display control unit 47 generates a video signal according to the NTSC standard or the like based on image data generated by the digital signal processing unit 45 and outputs the video signal to the rear display unit 14 and the in-finder display unit 28.

In a case where a setting mode is selected by an operation of the operation button 26 or the touch panel 27, the main control unit 41 drives and controls the display control unit 47 to make the rear display unit 14 display a setting menu. The setting menu enables setting of setting items relating to imaging conditions of the imaging unit of the digital camera 11. In the setting menu, a plurality of setting items are displayed. In a case where the setting mode is selected, the operation button 26 and the touch panel 27 function as a setting operation unit that sets setting information relating to the imaging conditions of the imaging unit. In the example, the setting information is set by an operation on the touch panel 27. Hereinafter, an operation of the user on the touch panel 27 is referred to as a setting operation. The rear display unit 14 functions as a display unit that displays a setting screen for performing a setting operation.

FIG. 4 is an example of a setting menu that is displayed on the rear display unit 14. In a setting menu M, a plurality of setting items, such as an image quality mode, a shutter system, a flash mode, an imaging mode, ISO sensitivity, and dynamic range setting, are displayed. The touch panel 27 is operated, whereby one setting item from among a plurality of setting items is selected.

In a setting item of the image quality mode, for example, a list of selection candidates, such as "FINE", "NORMAL", and "RAW", is displayed. "FINE" is a high image quality mode in which an image having a compression ratio of data lower than "NORMAL" is acquired. "RAW" is a mode in which image quality is higher than FINE since data is recorded without compressing data. The setting information of the image quality mode is selected from the above-described selection candidate list by an operation on the touch panel 27.

In a setting item of a shutter system, for example, a list of selection candidates, such as "MS", "ES", and "MS+ES", is displayed. "MS" indicates that imaging is performed with a mechanical shutter of the shutter unit 33. "ES" indicates that imaging is performed with an electronic shutter. "MS+ES" indicates that imaging is performed in a state in which one of the mechanical shutter and the electronic shutter suitable for, for example, a shutter speed is automatically selected. The setting information of the shutter system is selected from the above-described selection candidate list by an operation on the touch panel 27.

In a setting item of the flash mode, for example, a list of selection candidates, such as "AUTO", "FORCED FLASH", "SLOW SYNCHRO", "REAR-CURTAIN SYNCHRO", and "SUPPRESSED FLASH", is displayed. "AUTO" indicates that the flash light emission unit 24 automatically emits flash light in a case where a photometric sensor (not shown) determines that the subject is dark. "FORCED FLASH" indicates that the flash light emission unit 24 forcibly emits flash light regardless of ambient lightness. "SLOW SYNCHRO" indicates that the shutter speed is reduced, and the flash light emission unit 24 is made to emit flash light in synchronization with the shutter. "REAR-CURTAIN SYNCHRO" indicates that the flash light emission unit 24 is made to emit flash light immediately before the shutter is closed. "SUPPRESSED FLASH" indicates that the flash light emission unit 24 is not made to emit flash light regardless of ambient lightness. The setting information of the flash mode is selected from the above-described selection candidate list by an operation on the touch panel 27.

In a setting item of the imaging mode, for example, a list of selection candidates, such as "SINGLE FRAME IMAGING", "CONTINUOUS IMAGING", and "BRACKET IMAGING", is displayed. "SINGLE FRAME IMAGING" indicates that, each time the release switch 20 is fully depressed once, imaging and recording for one frame are performed. "CONTINUOUS IMAGING" indicates that, while the release switch 20 continues to be fully depressed, imaging is performed continuously for the number of frames according to the continuous shooting speed, and captured images for a plurality of frames are recorded. "BRACKET IMAGING" indicates that, each time the release switch 20 is fully depressed once, imaging for a plurality of frames is performed while changing a set value, such as an exposure value, and captured images for a plurality of frames are recorded. The setting information of the imaging mode is selected from the above-described selection candidate list by an operation on the touch panel 27.

In a setting item of the ISO sensitivity, for example, a list of selection candidates, such as "AUTO", "200", "250", "320", "400", "800", "1600", "3200", "6400", "12800", and "25600", is displayed. "AUTO" indicates that the sensitivity of the imaging element 34 is automatically adjusted within a range of equal to or less than predetermined ISO sensitivity. In a case where a numerical value of "200" to "25600" excluding "AUTO" is selected, the sensitivity of the imaging element 34 is adjusted to the selected numerical value. The setting information of the ISO sensitivity is selected from the above-described selection candidate list by an operation on the touch panel 27.

In a setting item of the dynamic range setting, for example, a list of selection candidates, such as "AUTO", "100", "200", and "400", is displayed. "AUTO" indicates that any one of imaging for acquiring an image of a standard dynamic range according to the size of the imaging element 34 and imaging for acquiring an image of a dynamic range more magnified than the standard dynamic range is automatically selected according to the lightness of the subject, or the like, and imaging is performed. "100" indicates that imaging for acquiring an image of the standard dynamic range of the imaging element 34, that is, a dynamic range of 100% is performed. "200" indicates that imaging for acquiring an image of a dynamic range magnified to 200% of the standard dynamic range of the imaging element 34 is performed. "400" indicates that imaging for acquiring an image of a dynamic range magnified to 400% of the standard dynamic range of the imaging element 34 is performed. The setting information of the dynamic range setting is selected from the above-described selection candidate list by an operation on the touch panel 27. An image of a magnified dynamic range can be acquired, for example, using the method described in JP2013-031205A or the like. Specifically, dynamic range magnified image data having excellent reproducibility within a wide range from high brightness to low brightness is acquired by performing imaging under different exposure conditions, acquiring a plurality of pieces of image data different in amount of information per brightness including an image with a large amount of information on a high brightness side, an image with a large amount of information on a low brightness side, and the like, and composing a plurality of pieces of image data.

The setting menu M is constituted of, for example, a plurality of pages, and a plurality of setting items are displayed on each page. In this case, it is possible to switch the pages of the setting menu M by the touch panel 27.

Among a plurality of setting items relating to the imaging conditions of the imaging unit, there may be setting information of a second setting item selectable exclusively with respect to setting information of a first setting item. The term "selectable exclusively" means that, in a case where one setting information in the first setting item is selected, setting information selectable in the second setting item is restricted.

As an example of the setting information in such an exclusive relationship, there are the setting information of the shutter system and the setting information of the flash mode.

The exclusive relationship between the setting information of the shutter system and the setting information of the flash mode will be described referring to FIGS. 5 to 7. FIG. 5 shows an example of a setting screen after the setting information of the shutter system is set in the setting menu M shown in FIG. 4, that is, in a state in which setting is completed. In the example, the shutter system is set to "MS". In FIG. 5, display surrounded by a double line indicates a state in which setting is completed.

Figure 6:
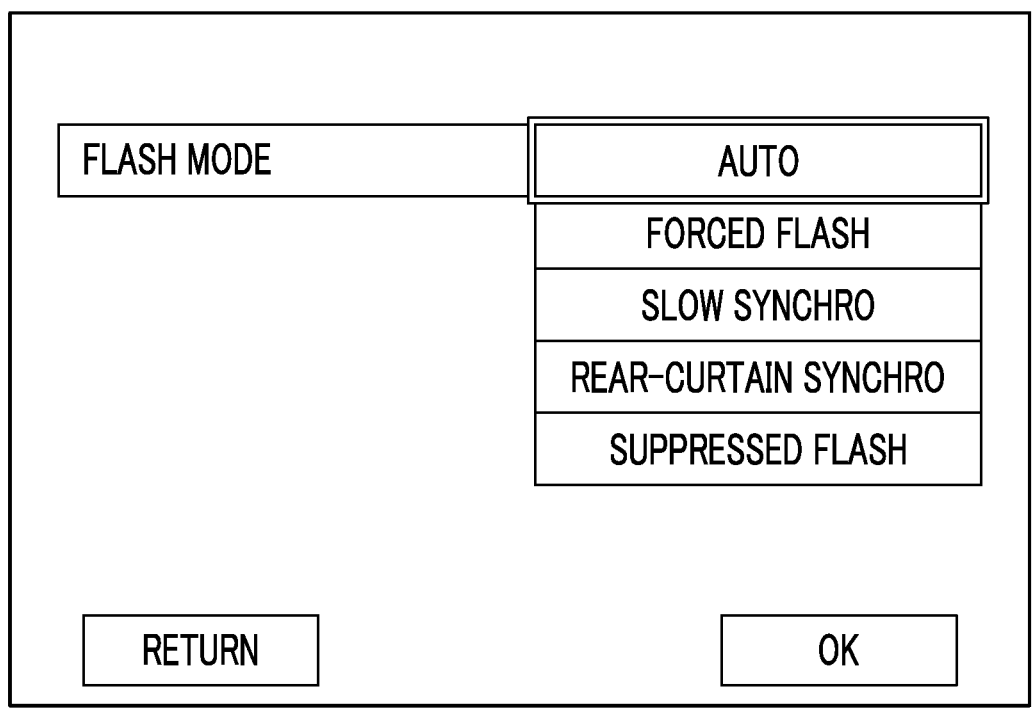
FIG. 6 is an explanatory view of the setting screen in a state in which setting information of a flash mode is set in the setting menu.

As shown in FIG. 6, in the flash mode, in a case where "MS" is set as the setting information of the shutter system, "AUTO", "FORCED FLASH", "SLOW SYNCHRO", "REAR-CURTAIN SYNCHRO", and "SUPPRESSED FLASH" are selectable as the setting information. FIG. 6 shows an example of the setting screen in a state in which the setting information of the flash mode is set in the setting menu M, and in the example, the flash mode is set to "AUTO". In FIG. 6, display surrounded by a double line indicates a state in which setting is completed.

Figure 7:
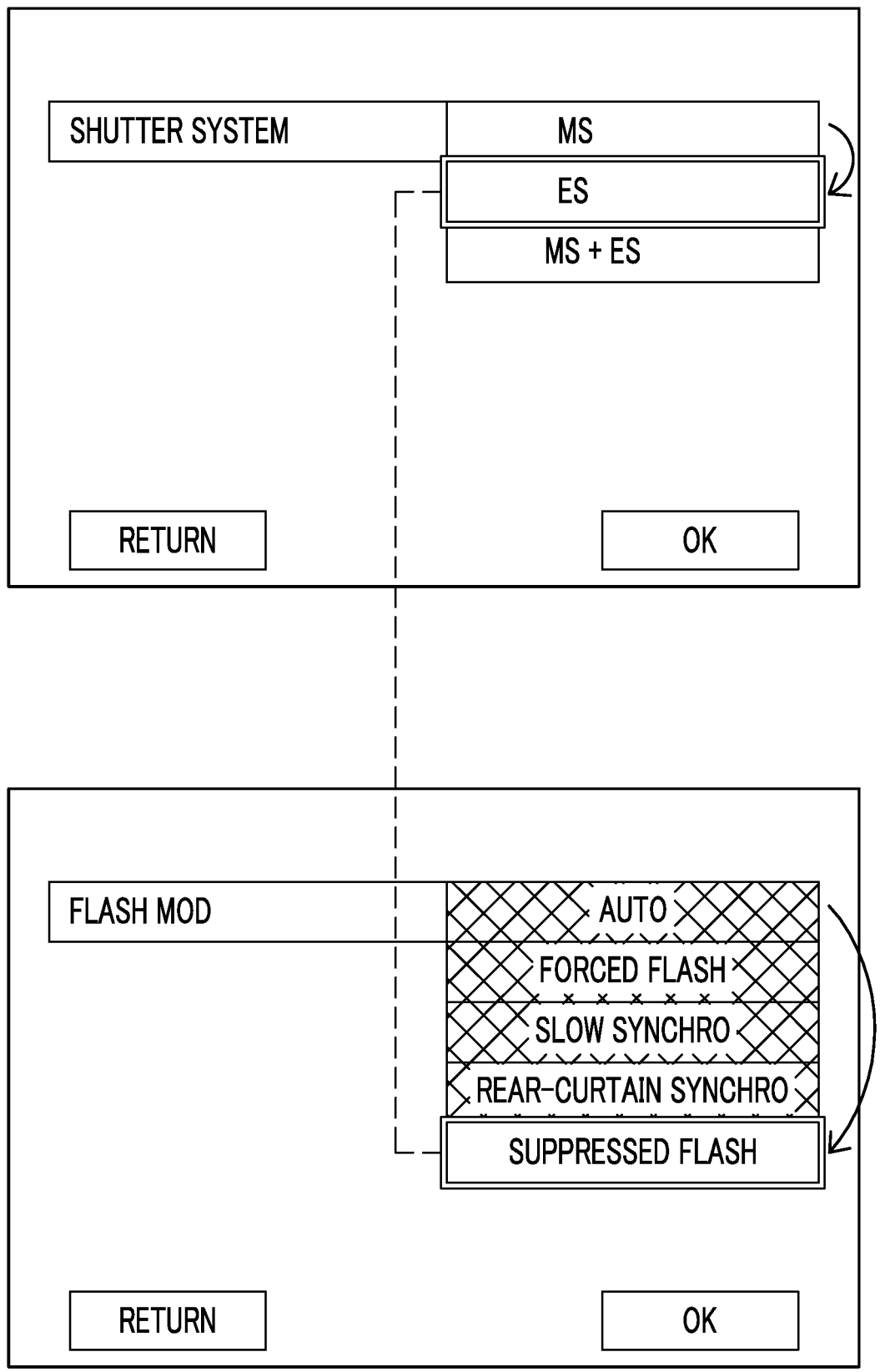
FIG. 7 is an explanatory view showing an example of the setting screen in a case where the setting information of the shutter system is changed and the setting information of the flash mode is changed to setting information according to the setting information of the shutter system.

As shown in FIG. 7, in a case where the setting information of the shutter system is changed from "MS" to, for example, "ES", the main control unit 41 makes "AUTO", "FORCED FLASH", "SLOW SYNCHRO", and "REAR-CURTAIN SYNCHRO" among the selection candidates of the flash mode unselectable, and changes the setting information of the flash mode to "SUPPRESSED FLASH". This is because the timing of exposure and signal reading is deviated for each pixel in the electronic shutter of the rolling shutter system, and accordingly, in a case where flash imaging is performed using the flash light emission unit 24, lightness of an acquired image is different partially in the image (for example, an upper portion of the image is bright, and a lower portion is dark).

The main control unit 41 makes the unselectable selection candidates be displayed in a special display form (in FIG. 7, a meshed portion). In the example shown in FIG. 7, for convenience of drawing, although the unselectable selection candidates are meshed, the invention is not limited thereto, and the unselectable selection candidates may be displayed in a color different from other selection candidates, for example, in gray.

The setting information in the exclusive relationship also includes the setting information of the setting items other than the setting information of the shutter system and the setting information of the flash mode. The setting information of the imaging mode and the setting information of the flash mode correspond to the setting information in the exclusive relationship. Specifically, in a case where "CONTINUOUS IMAGING" is selected as the setting information of the imaging mode, in the flash mode, only "SUPPRESSED FLASH" is selectable as the setting information, and all of "AUTO", "FORCED FLASH", "SLOW SYNCHRO", and "REAR-CURTAIN SYNCHRO" are unselectable. This is because, in a case where the imaging mode is set to "CONTINUOUS IMAGING", an electric charge accumulation time for one frame by the imaging element 34 is short and the flash light emission unit 24 does not emit flash light in time, that is, flash imaging cannot be performed.

The setting information of the ISO sensitivity and the setting information of the dynamic range setting are also in an exclusive relationship. Specifically, in a case where any one of "200", "250", and "320" is selected as the setting information of the ISO sensitivity, in the dynamic range setting, only "100" is selectable as the setting information, and all of "AUTO", "200", and "400" are unselectable. This is because, in a case where the ISO sensitivity is set to low sensitivity of "200", "250", and "320", an image with an amount of information within a wide range from high brightness to low brightness cannot be obtained in the imaging unit, that is, an image of a magnified dynamic range cannot be acquired.

As described above, in a case where there is the setting information of the second setting item selectable exclusively with respect to the setting information of the first setting item, since the main control unit 41 changes the setting information of the second setting item to the setting information according to the setting information of the first setting item, the setting information may be changed to the setting information not desired by the user. In a case where the main control unit 41 changes the setting information to the setting information not desired by the user, the user is highly likely to be brought into a confused state regardless of why the setting information is changed to such setting information. The confused state refers to a state in which the user does not know how an operation should be performed, half-forgets an operation, or performs an incorrect operation, that is, the user does not perform an operation well and is embarrassed. Accordingly, the main control unit 41 has a function of determining the confused state of the user and performing operation assistance for resolving the confused state.

Figure 8:
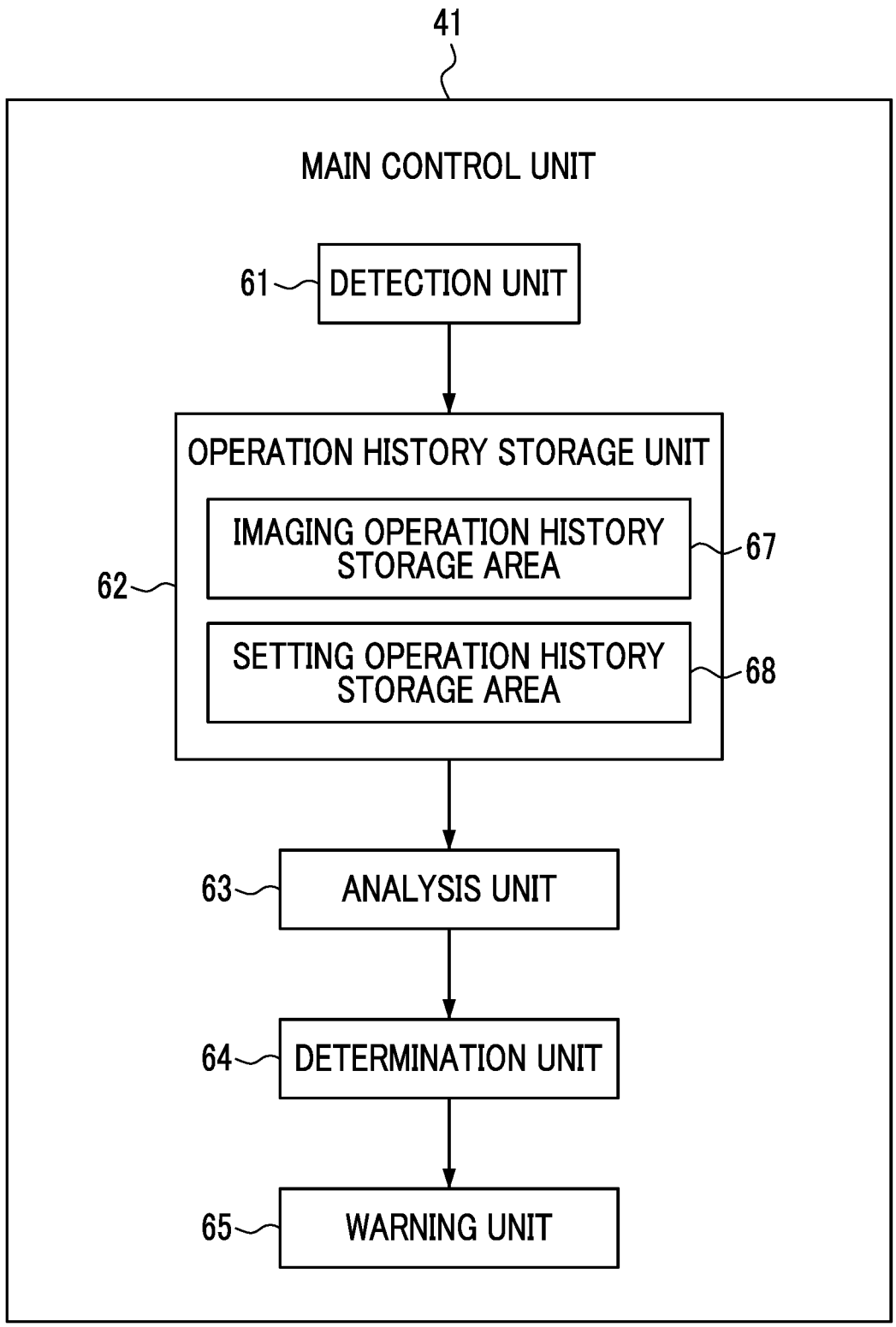
FIG. 8 is a block diagram showing the configuration of a main control unit.

As shown in FIG. 8, the main control unit 41 has a detection unit 61, an operation history storage unit 62, an analysis unit 63, a determination unit 64, and a warning unit 65. The main control unit 41 corresponds to a control unit described in the claims.

The detection unit 61 detects an imaging operation of a user on the imaging operation unit and a setting operation of the user on the setting operation unit as user operation information. The setting operation detected by the detection unit 61 is an operation to set the setting information in the exclusive relationship. For example, as described above, the operation to set the setting information in the exclusive relationship includes an operation to set "ES" as the setting information of the shutter system, an operation to set "CONTINUOUS IMAGING" as the setting information of the imaging mode, and the like. The detection unit 61 detects the user operation information from when a start operation to turn on a power source of the digital camera 11 is performed until an end operation to turn off the power source is performed.

Figure 9:
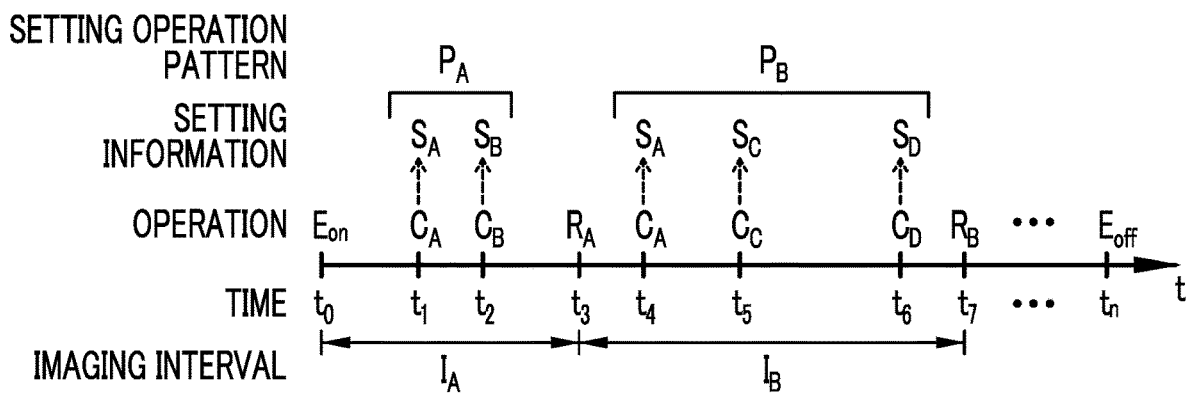
FIG. 9 is an explanatory view showing examples of an imaging operation and a setting operation that are detected by a detection unit in a period from a start operation to an end operation.

FIG. 9 shows an example of an imaging operation and a setting operation to be detected by the detection unit 61 from time to at which a start operation $E_{on}$ is performed to time $t_n$ at which an end operation $E_{off}$ is performed. In FIG. 9, $R_A$ and $R_B$ indicate imaging operations, and $C_A$, $C_B$, $C_C$, and $C_D$ indicate setting operations. The setting operations $C_A$ to $C_D$ are the setting operations different from one another.

In the example, in a period from time $t_0$ to time $t_3$ at which the imaging operation $R_A$ is detected, the setting operation $C_A$ is detected at time $t_1$, and the setting operation $C_B$ is detected at subsequent time $t_2$. In a period from time $t_3$ to time $t_7$ at which the imaging operation $R_B$ is detected, the setting operations $C_A$, $C_C$, and $C_D$ are detected in this order at time $t_4$ to $t_6$, respectively. The detection unit 61 also detects imaging operations and setting operations performed in a period from time $t_7$ to time $t_n$ as the user operation information. The time (imaging time) at which the imaging operation is detected by the detection unit 61 is obtained by a timepiece function of the main control unit 41.

$I_A$ indicates an imaging interval from the start operation $E_{on}$ to the imaging operation $R_A$, and $I_B$ indicates an imaging interval from the imaging operation $R_A$ to the imaging operation $R_B$. The imaging interval is measured by the main control unit 41 based on the imaging time at which each imaging operation is performed, each time the imaging operation is detected by the detection unit 61. In the example, $I_A=t_3-t_0$, and $I_B=t_7-t_3$. The imaging interval measured by the main control unit 41 is input to the determination unit 64 described below as the imaging interval based on the user operation information.

$S_A$, $S_B$, $S_C$, and $S_D$ indicate the setting information set by the setting operations $C_A$, $C_B$, $C_C$, and $C_D$, respectively. The setting information is acquired by the main control unit 41 based on each setting operation each time the setting operation is detected by the detection unit 61. The setting information acquired by the main control unit 41 is input to the determination unit 64 described below as the setting information based on the user operation information.

$P_A$ and $P_B$ indicate setting operation patterns that are obtained by the main control unit 41 each time the imaging operation is performed. The pattern refers to the setting information set by the setting operations and the order in a period between a present imaging operation and a last imaging operation (hereinafter, referred to as a period between the imaging operations). In a case where the present imaging operation is an initial imaging operation after the start operation, a period between the present imaging operation and the start operation is referred to as the period between the imaging operations. The setting operation pattern obtained by the main control unit 41 is input to the determination unit 64 described below as the setting operation pattern based on the user operation information. In the example, the setting operation pattern $P_A$ has the order of the setting information $S_A$ and $S_B$, the setting operation pattern $P_B$ has the order of the setting information $S_A$, $S_C$, and $S_D$.

The operation history storage unit 62 stores an imaging operation history as a history relating to the imaging operation and a setting operation history as a history relating to the setting operation performed before the imaging operation. In the embodiment, each time the imaging operation and the setting operation are detected by the detection unit 61, an imaging operation history relating to the detected imaging operation and a setting operation history relating to the detected setting operation is stored by the main control unit 41. The operation history storage unit 62 has an imaging operation history storage area 67 that stores the imaging operation history, and a setting operation history storage area 68 that stores the setting operation history (see FIG. 8).

Figure 10:
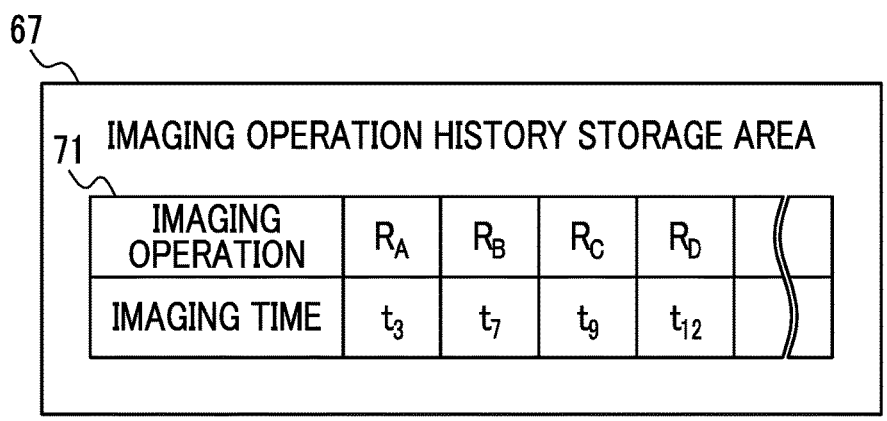
FIG. 10 is an explanatory view showing an example of an imaging operation history stored in an operation history storage unit.

FIG. 10 shows an example of an imaging operation history 71 stored in the imaging operation history storage area 67. In the imaging operation history 71, the imaging time at which the imaging operation is included. In FIG. 10, $R_C$ indicates an imaging operation detected at time $t_9$ after time $t_7$, and $R_D$ indicates an imaging operation detected at time $t_{12}$ after time $t_9$. In the example, any setting operation is performed at time $t_8$ between time $t_7$ and time $t_9$, and any setting operations are performed at time $t_{10}$ and $t_{11}$ between time $t_9$ and time $t_{12}$, respectively. In the embodiment, each time the imaging operation is detected by the detection unit 61, the imaging time of the detected imaging operation is stored as the imaging operation history.

Figures 11, 12:
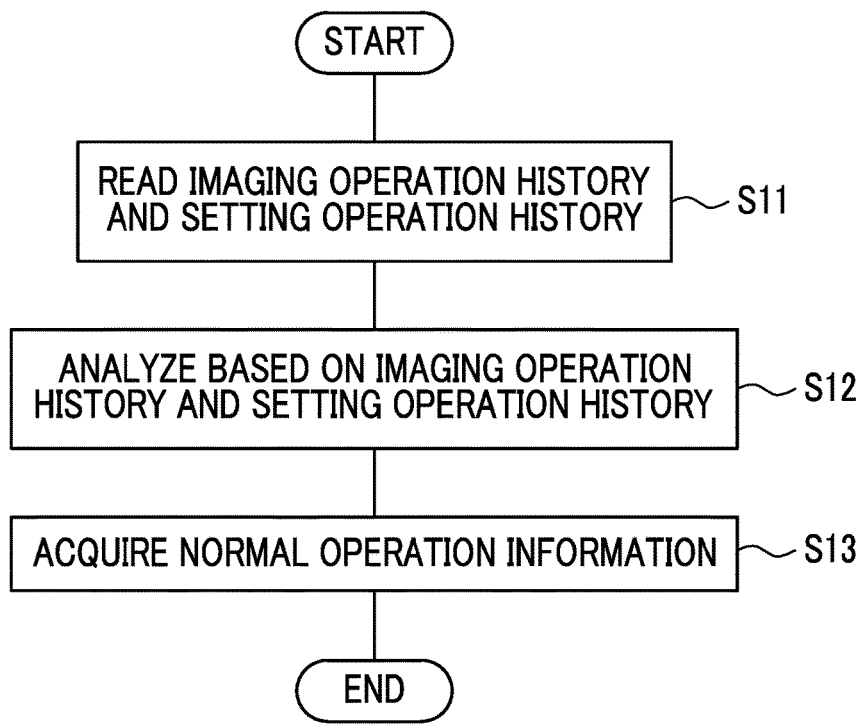
FIG. 11 is an explanatory view showing an example of a setting operation history stored in the operation history storage unit.
FIG. 12 is an explanatory view illustrating a method of acquiring normal operation information.

FIG. 11 shows an example of a setting operation history stored in the setting operation history storage area 68. In the embodiment, in the setting operation history storage area 68, a setting information history 72 relating to the setting information and a setting operation pattern history 73 relating to the setting operation pattern are stored as the setting operation history.

The setting information history 72 as the setting operation history is the number of times of setting of each piece of setting information set by the setting operation on the setting operation unit for at least one of the first setting item or the second setting item. The number of times of setting of each piece of setting information is the cumulative number of times that is added each time the setting operation is detected by the detection unit 61. In FIG. 11, the number of times of setting of each piece of setting information is shown in a descending order, the number of times of setting $M_A$ of the setting information $S_A$ is the greatest, and the numbers of times of setting $M_B$, $M_C$, $M_D$, . . . , and $M_X$ become smaller in the order of the setting information $S_B$, $S_C$, and $S_D$. For example, $M_A$ is "100", $M_B$ is "80", $M_C$ is "60", $M_D$ is "50", and $M_X$ is "1".

The setting operation pattern history 73 as the setting operation history is the number of times of setting of each setting operation pattern by the setting operation unit including the setting operation for at least one of the first setting item or the second setting item. The number of times of setting of each setting operation pattern is the cumulative number of times that is added each time the setting operation pattern is obtained by the main control unit 41. In FIG. 11, the number of times of setting of each setting operation pattern is shown in a descending order, the number of times of setting $N_A$ of the setting operation pattern $P_A$ is the greatest, and then, the numbers of times of setting $N_B$, . . . , and $N_X$ of the setting operation patterns become smaller in the order of the setting operation patterns $P_B$, . . . , and $P_X$. For example, $N_A$ is "30", $N_B$ is "20", and $N_X$ is "1". The setting operation pattern PX has the order of the setting information $S_D$, $S_B$, $S_A$, and $S_C$.

The analysis unit 63 analyzes operations of the user during a normal time on the imaging operation unit and the setting operation unit and the setting operation unit based on the imaging operation history and the setting operation history stored in the operation history storage unit 62 to acquire normal operation information. Hereinafter, a method of acquiring the normal operation information by the analysis unit 63 will be described.

As shown in FIG. 12, the method of acquiring the normal operation information by the analysis unit 63 includes a step of reading the imaging operation history and the setting operation history from the operation history storage unit 62 (Step S11), a step of performing analysis based on the read imaging operation history and setting operation history (Step S12), and a step of acquiring the normal operation information based on an analysis result (Step S13).

In Step S11, the analysis unit 63 reads the imaging time of each imaging operation from the imaging operation history storage area 67 as the imaging operation history and reads the number of times of setting of each setting information and the number of times of setting of each setting operation pattern from the setting operation history storage area 68 as the setting operation history.

In Step S12, the analysis unit 63 performs analysis for each history read from the operation history storage unit 62. For example, in a case where the number of times of setting of each piece of setting information is read, the analysis unit 63 obtains high-frequency setting information to be set by the user with a high frequency based on the number of times of setting of each piece of setting information. The high frequency refers to that the proportion of the number of times of setting in the total is equal to or greater than a predetermined threshold. For example, in a case where the total of the numbers of times of setting of the setting information is "500", the predetermined threshold is 7%, the number of times of setting $M_A$ is "100", the number of times of setting $M_B$ is "80", the number of times of setting $M_C$ is "60", the number of times of setting $M_D$ is "50", and the number of times of setting $M_X$ is "1", the analysis unit 63 obtains the proportion of each of the numbers of times of setting $M_B$, $M_C$, and $M_D$ in the total is equal to or greater than 7%, and the proportion of the number of times of setting $M_X$ in the total is less than 7%. For this reason, the analysis unit 63 sets the setting information $S_A$, $S_B$, $S_C$, and $S_D$ as the high-frequency setting information.

In a case where the number of times of setting of each setting operation pattern is read, the analysis unit 63 obtains a high-frequency setting operation pattern, in which the user performs the setting operation with a high frequency, based on the number of times of setting of each setting operation pattern. For example, the total of the number of times of setting of the setting operation patterns is "100", the predetermined threshold is 7%, the number of times of setting $N_A$ is "30", the number of times of setting $N_B$ is "20", and the number of times of setting $N_X$ is "1", the analysis unit 63 obtains that the proportion of each of the numbers of times of settings $N_A$ and $N_B$ in the total is equal to or greater than 7%, and the proportion of the number of times of setting $N_X$ in the total is less than 7%. For this reason, the analysis unit 63 sets the setting operation patterns $P_A$ and $P_B$ as the high-frequency setting operation pattern.

In a case where the imaging time of each imaging operation is read, the analysis unit 63 obtains a reference imaging interval, at which the user performs the imaging operation, based on the imaging time of each imaging operation. The reference imaging interval is, for example, an average value of the imaging interval to be measured by the main control unit 41 each time the imaging operation is performed.

In Step S13, the analysis unit 63 acquires the normal operation information for each analysis result. Specifically, in a case where the high-frequency setting information is obtained by the above-described analysis, the analysis unit 63 acquires the high-frequency setting information as the normal operation information. In a case where the high-frequency setting operation pattern is obtained by the above-described analysis, the analysis unit 63 acquires the high-frequency setting operation pattern as the normal operation information. In a case where the reference imaging interval is obtained by the above-described analysis, the analysis unit 63 acquires the reference imaging interval as the normal operation information.

The determination unit 64 determines that the user is in the confused state in which the user is confused about an operation in a case where the user operation information is different from the normal operation information after the normal operation information is acquired by the analysis unit 63. Hereinafter, a method of determining the confused state by the determination unit 64 will be described.

Figure 13:
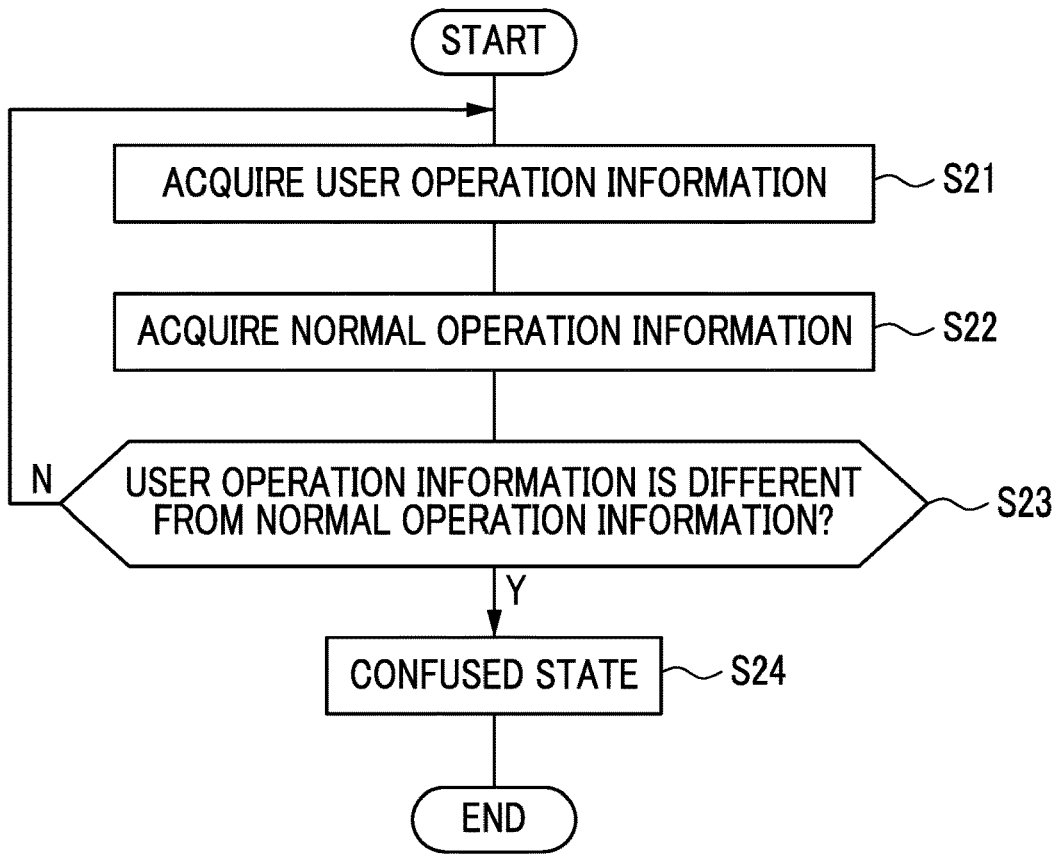
FIG. 13 is an explanatory view illustrating a method of determining a confused state.

As shown in FIG. 13, the method of determining the confused state by the determination unit 64 includes a step of acquiring the user operation information from the detection unit 61 (Step S21), a step of acquiring the normal operation information from the analysis unit 63 (Step S22), a step of performing comparison about whether or not the user operation information is different from the normal operation information (Step S23), and a step of determining the confused state in which the user is confused about an operation (Step S24).

In Step S21, in the embodiment, the determination unit 64 acquires the imaging interval based on the user operation information, the setting information based on the user operation information, and the setting operation pattern based on the user operation information from the main control unit 41.

In Step S22, in the embodiment, the determination unit 64 acquires, as the normal operation information, the high-frequency setting information, the high-frequency setting operation pattern, and the reference imaging interval from the analysis unit 63.

In Step S23, the determination unit 64 performs comparison for each piece of acquired user operation information. For example, in a case where the imaging interval based on the user operation information is acquired, the determination unit 64 compares the imaging interval based on the user operation information with the reference imaging interval acquired as the normal operation information. In a case where the setting information based on the user operation information is acquired, the determination unit 64 compares the setting information based on the user operation information with the high-frequency setting information acquired as the normal operation information. In a case where the setting operation pattern based on the user operation information is acquired, the determination unit 64 compares the setting operation pattern based on the user operation information with the high-frequency setting operation pattern acquired as the normal operation information.

In Step S24, the determination unit 64 performs determination for each piece of acquired user operation information. For example, in a case where the imaging interval based on the user operation information is acquired, the determination unit 64 determines to be confused state in a case where the proportion of the imaging interval based on the user operation information with respect to the reference imaging interval is equal to or greater than a predetermined threshold. The threshold in this case is, for example, 10%. In a case where the proportion is equal to or greater than the threshold, this is a situation in which the imaging operation is not performed by the user or a time is needed until the user performs the imaging operation. In a case where the setting information based on the user operation information is acquired, the determination unit 64 determines to be the confused state in a case where the setting information based on the user operation information is different from the high-frequency setting information. In a case where the setting operation pattern based on the user operation information is acquired, the determination unit 64 determines to be the confused state even in a case where the setting operation pattern based on the user operation information is different from the high-frequency setting operation pattern. In a case where determination is made to be the confused state, the determination unit 64 generates a notification signal for notifying the warning unit 65 that the user is in the confused state and outputs the notification signal to the warning unit 65.

Figure 14:
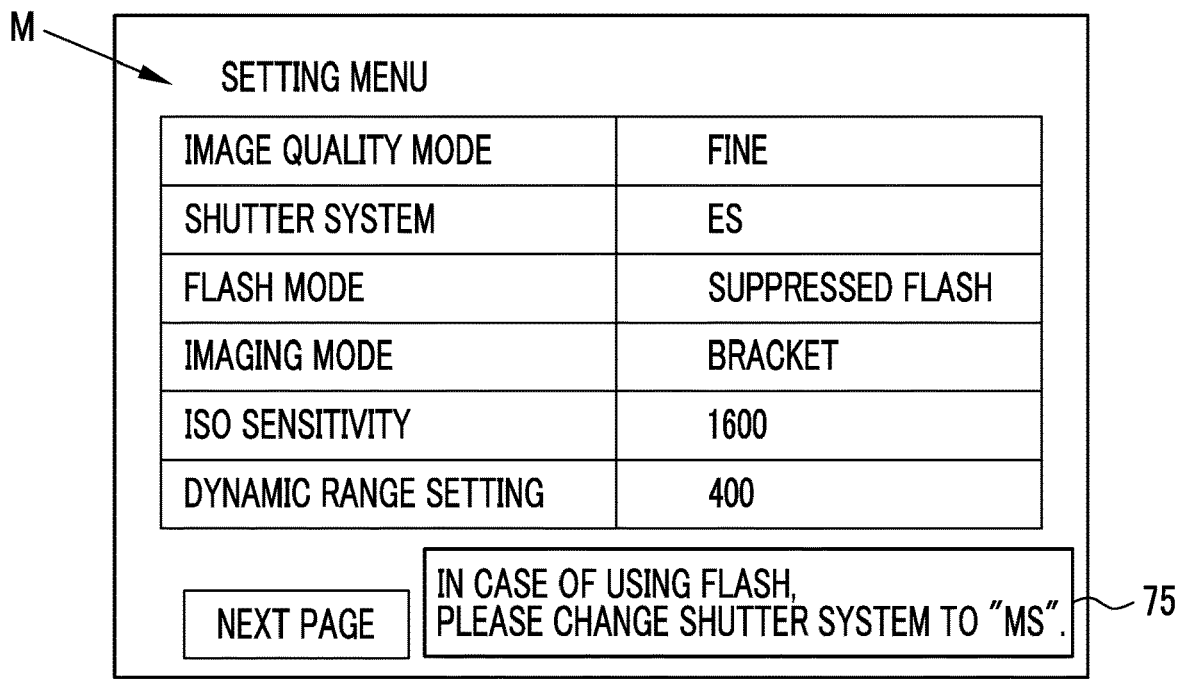
FIG. 14 is an explanatory view showing an example of a warning that is issued in a case where determination is made that a user is in the confused state.

The warning unit 65 issues a warning in a case where the determination unit 64 determines to be the confused state. The warning has, for example, a content for prompting the user to perform an operation to resolve the confused state. In a case where the notification signal is input from the determination unit 64, for example, the warning unit 65 performs warning display on the rear display unit 14 as a display unit. FIG. 14 shows an example of warning display that is performed in a case where the setting information of the shutter system is changed from "MS" to "ES" in the setting menu M. In FIG. 14, a warning display area 75 is displayed on a lower right side of the setting screen, and warning display "IN CASE OF USING FLASH, PLEASE CHANGE SHUTTER SYSTEM TO "MS"." is performed in the warning display area 75. The invention is not limited to the above-described warning display, and a warning may be issued by voice output.

Figure 15:
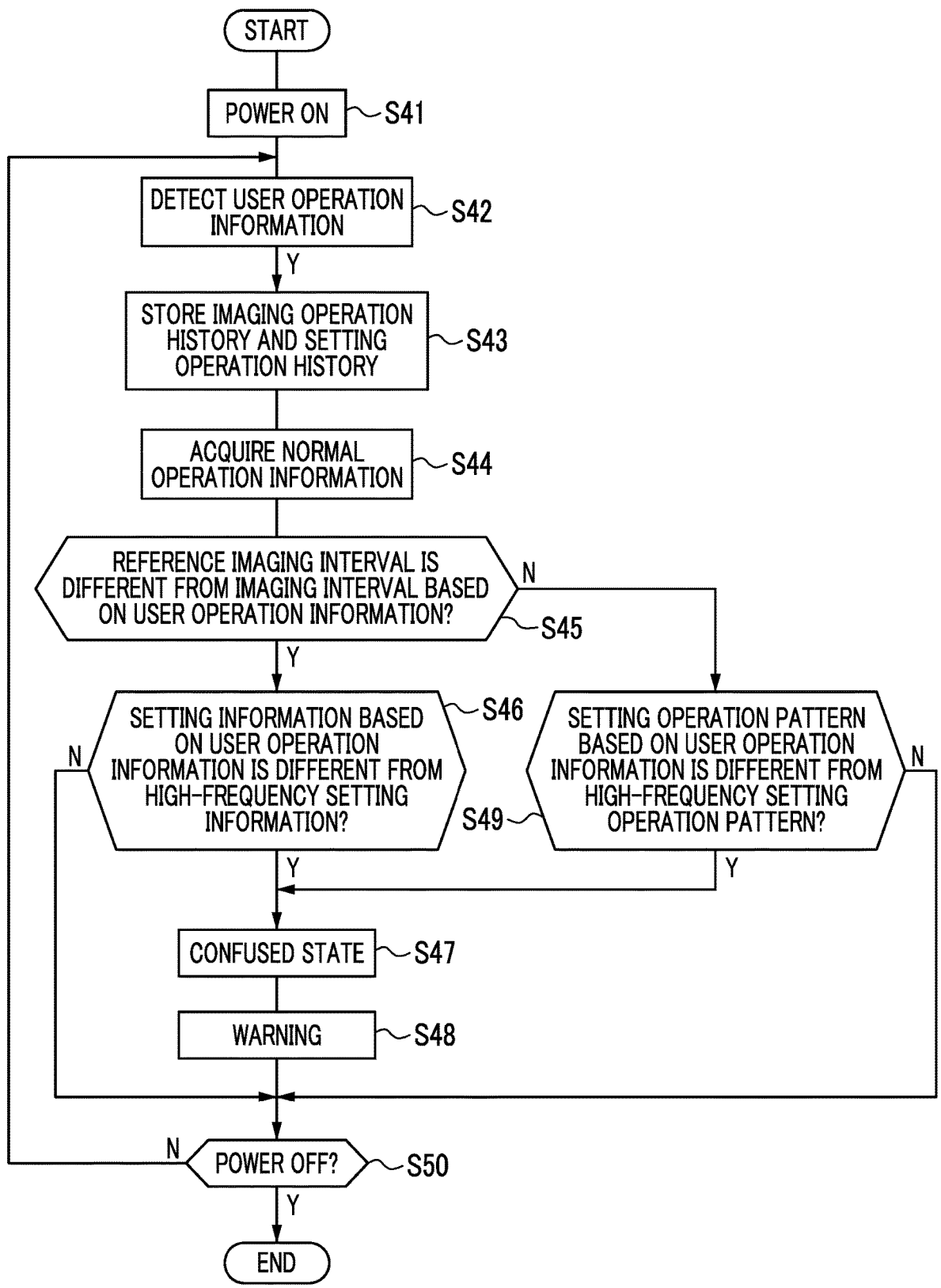
FIG. 15 is a flowchart illustrating an action of a digital camera.

An action of the digital camera 11 configured as above will be described according to the flowchart shown in FIG. 15. The digital camera 11 is powered on according to an operation of the user of the power lever 19 (Step S41), the imaging operation and the setting operation can be performed, and the imaging operation and the setting operation are detected by the detection unit 61 as the user operation information (Step S42).

The main control unit 41 stores, in the operation history storage unit 62, the imaging operation detected by the detection unit 61 as the imaging operation history and the setting operation detected by the detection unit 61 as the setting operation history (Step S43).

The analysis unit 63 acquires the normal operation information based on the imaging operation history and the setting operation history stored in the operation history storage unit 62 (Step S44). Specifically, the analysis unit 63 acquires the reference imaging interval, the high-frequency setting information, and the high-frequency setting operation pattern as the normal operation information.

After the normal operation information is acquired by the analysis unit 63, the determination unit 64 determines whether or not the user is in the confused state in which the user is confused about an operation. Specifically, the determination unit 64 first performs comparison about whether the reference imaging interval is different from the imaging interval based on the user operation information (Step S45).

In a case where the above-described imaging intervals are different from each other (in Step S45, Y), the determination unit 64 performs comparison about whether or not the setting information based on the user operation information is different from the high-frequency setting information (Step S46). In a case where the respective pieces of setting information described above are different from each other (in Step S46, Y), the imaging operation is performed at an imaging interval different from usual, the setting information with a low use frequency is set, and the user may be confused about an operation. For this reason, the determination unit 64 determines that the user is in the confused state in a case where the respective pieces of setting information described above are different from each other (Step S47).

In a case where the determination unit 64 determines to be the confused state, the warning unit 65 issues a warning for prompting an operation to resolve the confused state, or the like (Step S48). Specifically, the warning unit 65 performs the warning display on the rear display unit 14. Thereafter, in a case where the power source is not turned off (in Step S50, N), the process returns to Step S42 described above.

In a case where the setting information based on the user operation information is the same as the high-frequency setting information (in Step S46, N), the determination unit 64 determines that the user is not in the confused state. In this case, the warning is not issued, and the process progresses to Step S50.

In Step S45, in a case where the reference imaging interval is the same as the imaging interval based on the user operation information (in Step S45, N), the determination unit 64 performs comparison about whether or not the setting operation pattern based on the user operation information is different from the high-frequency setting operation pattern (Step S49). In a case where the above-described setting operation patterns are different from each other (in Step S49, Y), while the imaging operation is performed at the imaging interval as usual, imaging is performed in the setting operation pattern with a low use frequency, and the user is likely to be confused about an operation. For this reason, the determination unit 64 determines that the user is in the confused state (Step S47). In a case where the determination unit 64 determines to be the confused state, the process progresses to Step S48 and a warning is issued. In a case where the determination unit 64 determines that the user is not in the confused state (in Step S49, N), the warning is not issued, and the process progresses to Step S50.

As described above, in the embodiment, the operation of the user during the normal time is analyzed based on the imaging operation history and the setting operation history stored in the operation history storage unit to acquire the normal operation information, and in a case where the imaging operation and the setting operation performed by the user are different from the normal operation information, determination is made that the user is in the confused state in which the user is confused about an operation, and the warning is issued, whereby it is possible to easily resolve the confused state.

In the above-described embodiment, although the determination unit 64 performs the determination of the confused state based on the reference imaging interval, the high-frequency setting information, and the high-frequency setting operation pattern, the invention is not limited thereto, and the determination may be performed based on at least one of the reference imaging interval, the high-frequency setting information, or the high-frequency setting operation pattern. For example, in a case where the reference imaging interval is different from the imaging interval based on the user operation information, since this is a situation in which the imaging operation is not performed by the user or a time is needed until the user performs the imaging operation, the determination unit 64 determines to be the confused state. In a case where the setting information based on the user operation information is different from the high-frequency setting information, since this is a situation in which the setting information with a low use frequency is set, the determination unit 64 determines to be the confused state. In a case where the setting operation pattern based on the user operation information is different from the high-frequency setting operation pattern, since this is a situation in which the setting operation pattern with a low use frequency is set, the determination unit 64 determines to be the confused state. The determination may be performed based on a combination of two of the reference imaging interval, the high-frequency setting information, and the high-frequency setting operation pattern.

Second Embodiment

In the above-described first embodiment, although an example where the imaging operation history and the setting operation history are stored in the operation history storage unit 62 each time the user operation information is detected by the detection unit 61 has been described, the invention is not limited thereto, and in a second embodiment described below, in a case where the determination unit 64 determines to be not the confused state, the user operation information as the basis for the determination is stored as the imaging operation history or the setting operation history. That is, the imaging operation history and the setting operation history stored in the operation history storage unit 62 are updated by the main control unit 41.

Figure 16:
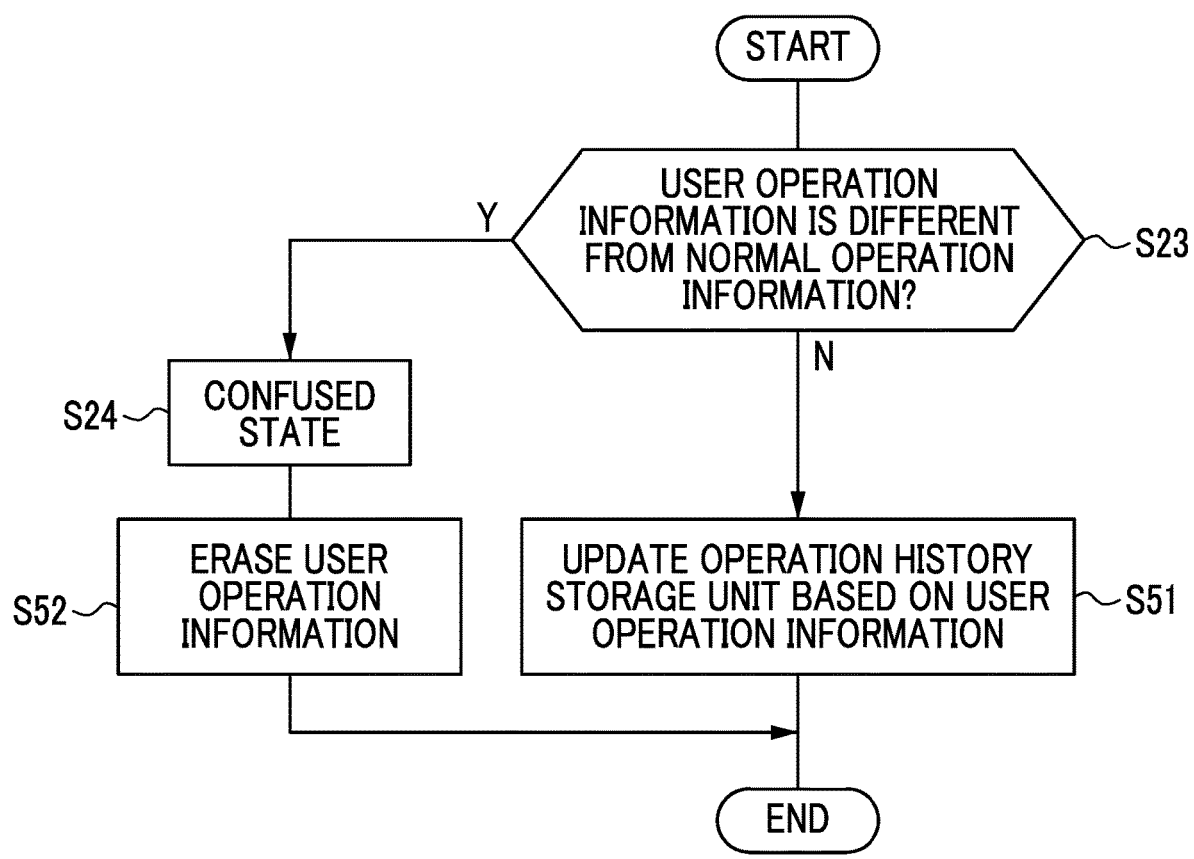
FIG. 16 is an explanatory view illustrating a method of, in a case where determination is made that the user is not in the confused state, storing user operation information to be a base of the determination as an imaging operation history or a setting operation history.

Specifically, as shown in FIG. 16, in a case where the user operation information detected by the detection unit 61, that is, the user operation information as the basis for the determination is the same as the normal operation information acquired by the analysis unit 63 (in Step S23, N), the determination unit 64 determines that the user is not in the confused state. The main control unit 41 updates the operation history storage unit 62 based on the imaging operation and the setting operation as the user operation information as the basis for the determination (Step S51). In other words, the main control unit 41 stores the user operation information as the basis for the determination to be not the confused state in the operation history storage unit 62 as the setting operation history or the imaging operation history.

For example, the main control unit 41 measures the imaging time at which the imaging operation is performed, and adds the measured imaging time to the imaging operation history 71 stored in the imaging operation history storage area 67. The main control unit 41 adds the number of times of setting of the setting information set by the setting operation to the setting information history 72 stored in the setting operation history storage area 68. The main control unit 41 obtains the setting operation pattern included in the setting information set by the setting operation and adds the number of times of setting of the obtained setting operation pattern to the setting operation pattern history 73 stored in the setting operation history storage area 68.

In a case where the determination unit 64 determines to be the confused state (Step S24), the main control unit 41 does not update the operation history storage unit 62 and erases the user operation information as the basis for the determination (Step S52). In other words, the main control unit 41 does not store the user operation information as the basis for the determination to be the confused state in the operation history storage unit 62 as the setting operation history or the imaging operation history.

As described above, the user operation information as the basis for the determination to be the confused state is not stored in the operation history storage unit 62 as the setting operation history or the imaging operation history, and the user operation information as the basis for the determination to be not the confused state is stored in the operation history storage unit 62 as the setting operation history or the imaging operation history. Accordingly, since an operation history of the user during the normal time is stored in the operation history storage unit 62, the accuracy of determining the confused state is further improved.

In the respective embodiments described above, although an example, each piece of setting information is set by an operation on the touch panel 27 has been described, the invention is not limited thereto, various pieces of setting information may be set by an operation of the operation button 26, an exposure correction dial 21, a shutter speed dial 22, or the like.

In the respective embodiments described above, the imaging operation history and the setting operation history stored in the operation history storage unit 62 may be reset by an operation on the touch panel 27 or the like. Furthermore, sample data of an imaging operation and a setting operation obtained from a product test or the like at the time of factory shipment of the digital camera 11 may be stored in the operation history storage unit 62 as an imaging operation history and a setting operation history in advance.

In the respective embodiments described above, the imaging element 34 is a CMOS image sensor, but may be a CCD image sensor. In the respective embodiments described above, the finder unit is a hybrid view finder, but may be an electronic view finder. In the respective embodiments described above, although the internal flash light emission unit is used, an external flash device may be used.

The invention can be applied to an integrated imaging apparatus in which a lens barrel and a camera body are integrated, and a lens interchangeable imaging apparatus in which a lens barrel and a camera body can be attached and detached.

A computer program (operation program) for executing the functions of the analysis unit 63, the determination unit 64, and the warning unit 65 may be stored in a ROM (not shown) of the main control unit 41, and the main control unit 41 may be made to execute the functions based on the computer program.

The invention is not limited to the digital camera, and can be applied to other imaging apparatuses included in a digital video camera, a mobile phone, a smartphone, a tablet terminal, and the like.

EXPLANATION OF REFERENCES

11: digital camera
12: camera body
13: lens barrel
14: rear display unit
15: finder unit
15a: finder objective window
15b: finder eyepiece unit
16: imaging optical system
17: focus ring
18: stop ring
19: power lever
20: release switch
21: exposure correction dial
22: shutter speed dial
23: finder switch lever
24: flash light emission unit
26: operation button
27: touch panel
28: in-finder display unit
31: focus lens
32: stop unit
32a: stop leaf blade
33: shutter unit
34: imaging element
36, 37, 38: motor
39: motor driver
41: main control unit
42: bus
44: memory control unit
45: digital signal processing unit
46: medium control unit
47: display control unit
48: setting information storage unit
49: memory
51: recording medium
61: detection unit
62: operation history storage unit
63: analysis unit
64: determination unit
65: warning unit
67: imaging operation history storage area
68: setting operation history storage area
71: imaging operation history
72: setting information history
73: setting operation pattern history
75: warning display area

What is claimed is:

1. An imaging apparatus comprising:
an imager that captures a subject image;
an imaging operation member that makes the imager perform an imaging operation;
a setting operation member that sets setting information of a first setting item and setting information of a second setting item selectable exclusively with respect to the setting information of the first setting item for setting items relating to imaging conditions of the imager; and
a processor configured to:
   detect an imaging operation of a user on the imaging operation member and a setting operation of the user on the setting operation member as user operation information;
   store an imaging operation history as a history relating to the imaging operation and a setting operation history as a history relating to the setting operation performed before the imaging operation;
   analyze an operation of the user on the imaging operation member and the setting operation member based on the imaging operation history and the setting operation history to acquire normal operation information;
   determine that the user is in a confused state in which the user is confused about an operation in a case where the user operation information is different from the normal operation information after the normal operation information is acquired; and
   issue a warning in a case where it is determined to be the confused state,
wherein the setting operation history is the number of times of setting of each piece of the setting information set by the setting operation member for at least one of the first setting item or the second setting item,
the processor acquires high-frequency setting information to be set by the user with a high frequency as the normal operation information based on the number of times of setting of each piece of setting information, and
determines to be the confused state in a case where setting information based on the user operation information is different from the high-frequency setting information.

2. The imaging apparatus according to claim 1,
wherein the setting operation history is the number of times of setting of each setting operation pattern of the setting operation member including a setting operation for at least one of the first setting item or the second setting item,
the processor acquires a high-frequency setting operation pattern, in which the user performs the setting operation with a high frequency, as the normal operation information based on the number of times of setting of each setting operation pattern, and
determines to be the confused state in a case where a setting operation pattern based on the user operation information is different from the high-frequency setting operation pattern.

3. The imaging apparatus according to claim 1,
wherein an imaging time at which the imaging operation is performed is included in the imaging operation history,
the processor acquires a reference imaging interval, at which the user performs an imaging operation, as the normal operation information based on the imaging time, and
compares the reference imaging interval with an imaging interval based on the user operation information to determine whether or not to be the confused state.

4. The imaging apparatus according to claim 1,
wherein, in a case where the processor determines to be the confused state, the user operation information to be a base of determination is prohibited from being stored as the setting operation history or the imaging operation history, and in a case where the processor determines to be not the confused state, the user operation information to be a base of determination is stored as the setting operation history or the imaging operation history.

5. The imaging apparatus according to claim 1, further comprising:
a display that displays a setting screen for performing the setting operation,
wherein the processor performs warning display on the display.

6. A control method for an imaging apparatus,
the control method comprising:
a step of analyzing an operation of a user on an imaging operation member that makes an imager perform an imaging operation and a setting operation member based on an imaging operation history and a setting operation history to acquire normal operation information,
wherein the setting operation member sets setting information of a first setting item and setting information of a second setting item selectable exclusively with respect to the setting information of the first setting item for setting items relating to imaging conditions of the imager, and
wherein the imaging operation history is stored as a history relating to the imaging operation and the setting operation history as a history relating to the setting operation performed before the imaging operation;
a step of determining that the user is in a confused state in which the user is confused about an operation in a case where a user operation information is different from the normal operation information after the normal operation information is acquired, wherein the imaging operation of the user on the imaging operation member and a setting operation of the user on the setting operation member is detected as user operation information; and
a step of issuing a warning in a case where determination is made to be the confused state,
wherein the setting operation history is the number of times of setting of each piece of the setting information set by the setting operation member for at least one of the first setting item or the second setting item,
high-frequency setting information to be set by the user is acquired with a high frequency as the normal operation information based on the number of times of setting of each piece of setting information, and
a case where setting information based on the user operation information is different from the high-frequency setting information is determined to be the confused state.

7. A non-transitory computer readable medium for storing a computer-executable program for operating an imaging apparatus,
the computer-executable program causing the computer to:
detect an imaging operation of a user on an imaging operation member that makes an imager perform an imaging operation and a setting operation of the user on a setting operation member as user operation information,
wherein the setting operation member sets setting information of a first setting item and setting information of a second setting item selectable exclusively with respect to the setting information of the first setting item for setting items relating to imaging conditions of the imager,
store an imaging operation history as a history relating to the imaging operation and a setting operation history as a history relating to the setting operation performed before the imaging operation,
analyze an operation of the user on the imaging operation member and the setting operation member based on the imaging operation history and the setting operation history to acquire normal operation information;
determine that the user is in a confused state in which the user is confused about an operation in a case where the user operation information is different from the normal operation information after the normal operation information is acquired; and
issue a warning in a case where determination is made to be the confused state,
wherein the setting operation history is the number of times of setting of each piece of the setting information set by the setting operation member for at least one of the first setting item or the second setting item,
high-frequency setting information to be set by the user is acquired with a high frequency as the normal operation information based on the number of times of setting of each piece of setting information, and
a case where setting information based on the user operation information is different from the high-frequency setting information is determined to be the confused state.

* * * * *